United States Patent
Inada

(10) Patent No.: US 9,041,543 B2
(45) Date of Patent: May 26, 2015

(54) INATTENTIVE STATE DETERMINATION APPARATUS AND METHOD OF DETERMINING INATTENTIVE STATE

(71) Applicant: DENSO CORPORATION, Aichi-Pref (JP)

(72) Inventor: Junya Inada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 228 days.

(21) Appl. No.: 13/760,489

(22) Filed: Feb. 6, 2013

(65) Prior Publication Data

US 2013/0207805 A1 Aug. 15, 2013

(30) Foreign Application Priority Data

Feb. 9, 2012 (JP) .................................. 2012-26263

(51) Int. Cl.
| | |
|---|---|
| *B60Q 5/00* | (2006.01) |
| *B60R 11/04* | (2006.01) |
| *G08G 1/16* | (2006.01) |
| *B60K 28/06* | (2006.01) |

(52) U.S. Cl.
CPC .............. *B60Q 5/005* (2013.01); *B60K 28/066* (2013.01); *B60W 2540/22* (2013.01)

(58) Field of Classification Search
CPC . B60K 28/066; B60Q 5/005; B60W 2540/22; G02B 27/0093; G06F 3/012; G06F 3/013; G06F 3/017; G06K 9/00375; G06K 9/00845
USPC ................... 340/439, 575, 576; 382/103, 118
See application file for complete search history.

(56) References Cited

U.S. PATENT DOCUMENTS

| | | | |
|---|---|---|---|
| 7,957,567 B2* | 6/2011 | Yamaguchi | 382/118 |
| 2004/0193413 A1* | 9/2004 | Wilson et al. | 704/243 |

(Continued)

FOREIGN PATENT DOCUMENTS

| | | | | |
|---|---|---|---|---|
| CN | 101593352 A | * | 12/2009 | ...................... 341/576 |
| JP | 2003-131785 A | | 5/2003 | |

(Continued)

OTHER PUBLICATIONS

JP 2009-009244A, Moriizumi, machine translation of the full document from JPO AIPN website, 14 pages.*

(Continued)

*Primary Examiner* — Benjamin C Lee
*Assistant Examiner* — Stephen Burgdorf
(74) *Attorney, Agent, or Firm* — Posz Law Group, PLC

(57) ABSTRACT

An inattentive state determination apparatus being placed in a vehicle includes an image taking section, an orientation detection section, a determination section, a warning section, a shape detection section, and a setting section. The image taking section successively takes images of a face of a determination target. Based on the images, the orientation detection section and the shape detection section detect a determination target orientation and a hand shape, respectively. The determination section determines whether the determination target is in an inattentive state based on the determination target orientation by determining an inattentive state determination condition. The warning section notifies the inattentive state by outputting an audio warning corresponding to a parameter of the audio warning. The setting section sets at least one of the inattentive state determination condition and the parameter of the audio warning based on the hand shape and the determination target orientation.

12 Claims, 13 Drawing Sheets

(56) References Cited

U.S. PATENT DOCUMENTS

2009/0304232 A1* 12/2009 Tsukizawa .................. 382/103
2011/0317874 A1* 12/2011 Ikenoue ....................... 382/103
2012/0072121 A1* 3/2012 Mollicone et al. ............. 702/19
2013/0077818 A1* 3/2013 Tan et al. ..................... 382/103

FOREIGN PATENT DOCUMENTS

| JP | 2006-282145 A | 10/2006 |
| JP | 2009-009244 A | 1/2009 |
| JP | A-2009-176112 | 8/2009 |

OTHER PUBLICATIONS

CN 101593352 A, Feng, partial machine translation, WIPO Patentscope web site, 9 pages.*

Office action mailed Dec. 17, 2013 in the corresponding JP application No. 2012-026263 (and English translation).

\* cited by examiner

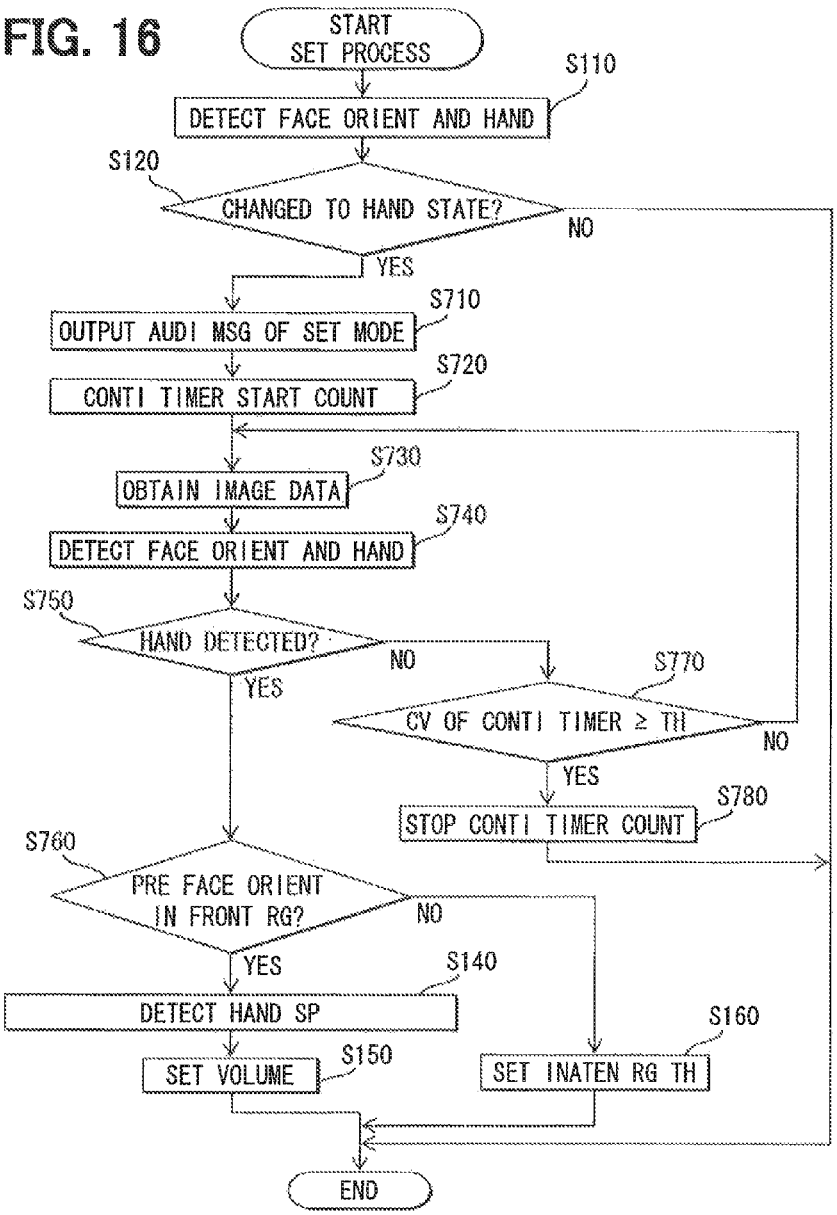

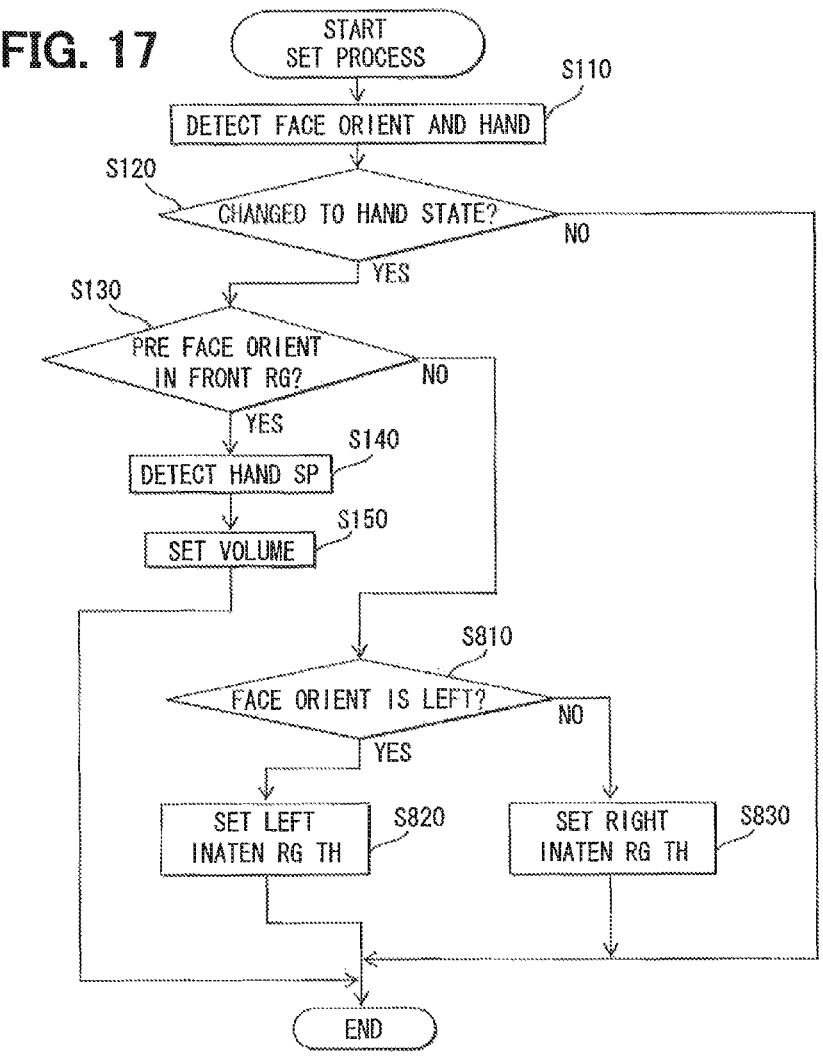

INATTENTIVE STATE DETERMINATION APPARATUS AND METHOD OF DETERMINING INATTENTIVE STATE

CROSS REFERENCE TO RELATED APPLICATION

This application is based on Japanese Patent Application No. 2012-026263 filed on Feb. 9, 2012, the disclosure of which is incorporated herein by reference.

TECHNICAL FIELD

The present disclosure relates to an inattentive state determination apparatus and a method of determining an inattentive state.

BACKGROUND

Conventionally, in order to support a driver of a vehicle, a gaze direction of the driver is detected to determine whether the driver is in an attentive state. When the gaze direction of the driver is out of a normal range, the driver is determined to be in an inattentive state, and a warning is given to the driver.

Further, a field of a vision varies from individual to individual. Thus, the normal range used to determine whether the driver is in the inattentive state needs to be changed from individual to individual. JP 2009-176112 A discloses an apparatus in which the normal range is settable by an operation of the driver. Specifically, the driver operates switches disposed in a compartment of the vehicle to input information relative to the normal range.

In JP 2009-176112 A, the driver needs to input numbers indicating the normal range to the apparatus via the switches. For example, the driver inputs minus thirty degrees to plus thirty degrees (−30 degrees to +30 degrees) to the apparatus. Thus, the apparatus disclosed in JP 2009-176112 A necessarily includes the switches for setting the normal range. Since, hardware configurations, such as the switches, need to be added, it is difficult to add the function of setting the normal range to the apparatus.

SUMMARY

In view of the foregoing difficulties, it is an object of the present disclosure to provide an inattentive state determination apparatus in which a parameter for determining an inattentive state is set and changed easily. It is another object of the present disclosure to provide a method of determining an inattentive state in which a parameter for determining an inattentive state is set and changed easily.

According to a first aspect of the present disclosure, an inattentive state determination apparatus being placed in a vehicle includes an image taking section, an orientation detection section, a determination section, a warning section, a shape detection section, and a setting section. The image taking section successively takes a plurality of images of a face of a determination target. The determination target is a person seated in a driving seat of the vehicle. The orientation detection section detects a determination target orientation based on the images. The determination target orientation is one of a face orientation of the determination target and a gaze direction of the determination target. The determination section determines whether the determination target is in an inattentive state based on the determination target orientation. The determination section determines that the determination target is in the inattentive state when an inattentive state determination condition is satisfied. The warning section notifies the inattentive state to the determination target by outputting an audio warning when the determination section determines that the determination target is in the inattentive state. The audio warning is output corresponding to a parameter of the audio warning. The shape detection section detects a hand shape of the determination target based on the images when one of the images includes a hand of the determination target. The setting section sets at least one of the inattentive state determination condition and the parameter of the audio warning based on the hand shape and the determination target orientation.

With the above apparatus, the inattentive state determination condition and the parameter of the audio warning are easily set and changed without adding hardware configurations.

According to a second aspect of the present disclosure, a method of determining an inattentive state includes taking successively a plurality of images of a face of a determination target, detecting a determination target orientation of the determination target based on the images, determining whether an inattentive state determination condition is satisfied based on the determination target orientation, warning an inattentive state of the determination target by outputting a audio warning when the inattentive state determination condition is satisfied, detecting a hand shape of the determination target based on the images when one of the images includes a hand of the determination target, and setting at least one of the inattentive state determination condition and the parameter of the audio warning based on the hand shape and the determination target orientation. The determination target orientation is one of a face orientation of the determination target and a gaze direction of the determination target. The audio warning is output corresponding to a parameter of the audio warning.

With the above method, the inattentive state determination condition and the parameter of the audio warning are easily set and changed without adding hardware configurations.

BRIEF DESCRIPTION OF THE DRAWINGS

The above and other objects, features and advantages of the present disclosure will become more apparent from the following detailed description made with reference to the accompanying drawings. In the drawings:

FIG. 16 is a flowchart showing a setting process of parameters, which are used for determining the inattentive state, according to a fifth embodiment of the present disclosure; and FIG. 17 is a flowchart showing a setting process of parameters, which are used for determining the inattentive state, according to another embodiment of the present disclosure.

DETAILED DESCRIPTION (First Embodiment)

The following will describe an inattentive state determination apparatus 1 according to a first embodiment of the present disclosure with reference to FIG. 1 to FIG. 7.

Figure 1:
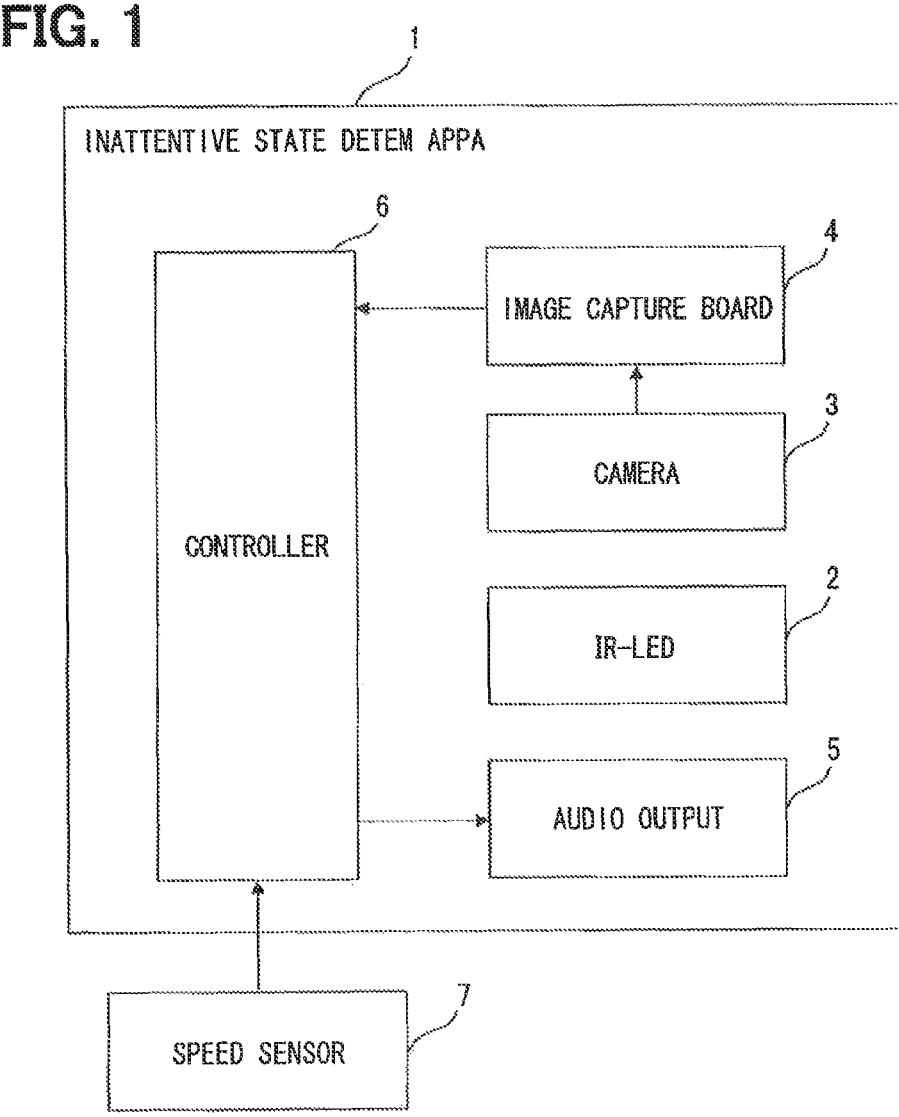
FIG. 1 is a block diagram showing a configuration of an inattentive state determination apparatus according to an embodiment of the present disclosure.

As shown in FIG. 1, the inattentive state determination apparatus 1 includes a infrared light emitting diode (IR-LED) 2, a camera 3, an image capture board 4, an audio output device (AUDIO OUTPUT) 5, and a controller 6. The inattentive state determination apparatus 1 is placed in a vehicle.

The IR-LED 2 emits near infrared light toward a face of a determination target, who is seated in a driving seat of the vehicle. Hereinafter, the determination target seated in the driving seat is referred to as a driver. The camera 3 is a near-infrared camera, and successively takes images of the face of the driver. The image capture board 4, which is well known, stores data of the images taken by the camera 3. Hereinafter, the data of the images are also referred to as image data. The audio output device 5 outputs, for example, an audio signal indicating a route guidance. In the present embodiment, the inattentive state refers to a driving state in which the driver looks aside for a predetermined period. The driving during which the driver looks aside for the predetermined period is also referred to as an inattentive driving.

The controller 6 controls an operation of the inattentive state determination apparatus 1 by executing predetermined processes. Specifically, the controller 6 detects a face orientation of the driver as a determination target orientation based on the images taken by the camera 3, and controls the audio output device 5. Further, the controller 6 receives a detection signal from a speed sensor 7 coupled to the controller 6. The speed sensor 7 detects a speed of the vehicle, and transmits the detection signal to the controller 6.

Figure 2:
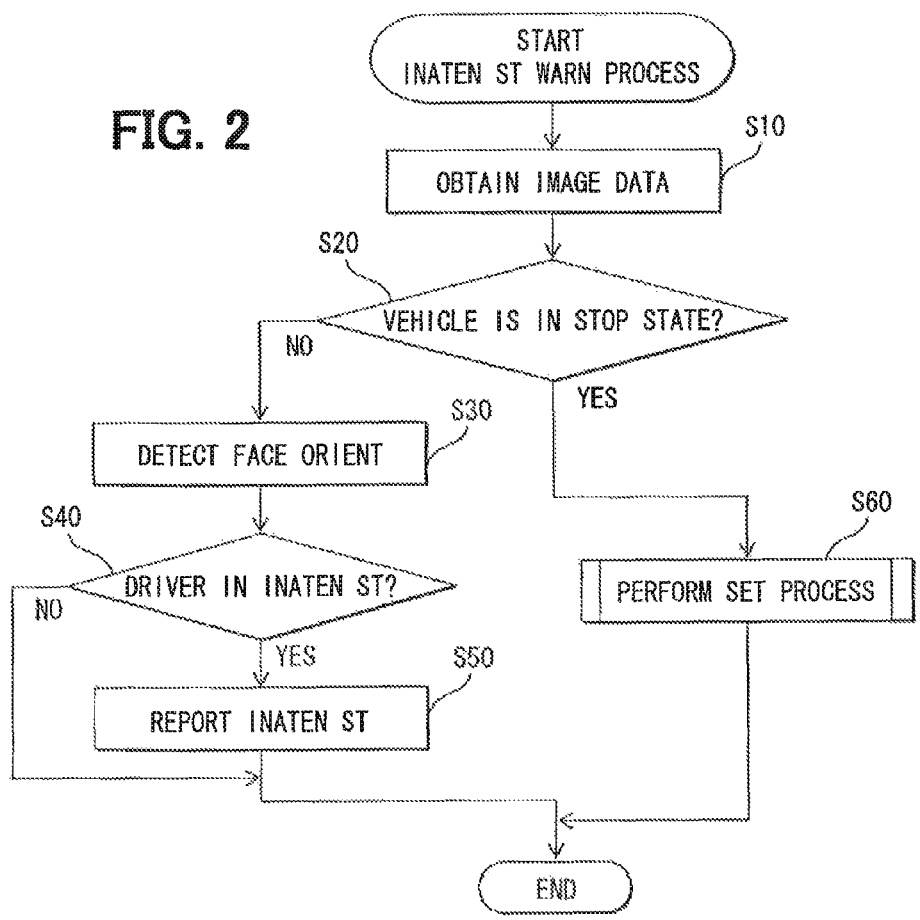
FIG. 2 is a flowchart showing an inattentive state warning process.

The following will describe an inattentive state warning process executed by the controller 6 with reference to FIG. 2. The controller 6 executes the inattentive state warning process based on the face orientation of the driver. The inattentive state warning process is repeatedly executed during an operation of the inattentive state determination apparatus 1.

When the inattentive state warning process starts, at S10, the controller 6 obtains the image data from the image capture board 4. As described above, the image data is data of the images taken by the camera 3, and is stored in the image capture board 4. When obtaining the image data, the controller 6 determines whether the image data has been previously obtained. When the controller 6 determines that the image date has not been obtained, the controller 6 obtains the image data from the image capture board 4. Hereinafter, the image data that has not been previously obtained by the controller 6 are referred to as latest image data. At S20, the controller 6 determines whether the vehicle is in a stop state based on the detection signal received from the speed sensor 7. Hereinafter, the vehicle to which the inattentive state determination apparatus 1 may also be referred to as a subject vehicle. At S20, when the controller 6 is not in the stop state (S20: NO), the controller 6 detects the face orientation of the driver by performing an image recognition process, such as a pattern matching, to the latest image data obtained from the image capture board 4 at S30.

At S40, the controller 6 determines whether the driver is in the inattentive state based on the face orientation detected at S30. Specifically, during the driving, when the face orientation of the driver is out of a normal range for the predetermined period, the controller 6 determines that the driver is in the inattentive state. The normal range of the face orientation is a range of the face orientation when the driver is in a normal driving state without looking aside. Since the normal range is used to determine the inattentive state of the driver, the normal range is also referred to as an inattentive state threshold range, hereinafter. That is, when the face orientation is within the inattentive state threshold range, the driver is in the normal driving state. Further, the predetermined time for determining the inattentive state is also referred to as an inattentive state threshold period. A condition that face orientation of the driver is out of the inattentive state threshold range for the inattentive state threshold period is also referred to as an inattentive state determination condition. That is, when the inattentive state determination condition is satisfied, the driver is determined to be in the inattentive state. At S40, when the controller 6 determines that the driver is not in the inattentive state (S40: NO), the controller 6 ends the inattentive state warning process. At S40, when the controller 6 determines that the driver is in the inattentive state (S40: YES), the controller 6 activates the audio output device 5 to output an audio warning message or an audio warning alarm at a predetermined volume to warn the driver of the inattentive state. The audio warning message or the audio warning alarm is referred to as an audio warning, hereinafter. Further, the predetermined volume is also referred to as a parameter of the audio warning. Then, the controller 6 ends the inattentive state warning process.

At S20, when the controller 6 determines that the vehicle is in the stop state (S20: YES), the controller 6 performs a setting process, which will be described later in detail, at S60. During the setting process, the controller 6 sets parameters for determining the inattentive state of the driver. That is, the controller 6 sets parameters of the inattentive state determination condition. Then, the controller 6 ends the inattentive state warning process. Herein, the parameters for determining the inattentive state include the inattentive state threshold range and the inattentive state threshold period.

Figure 3:
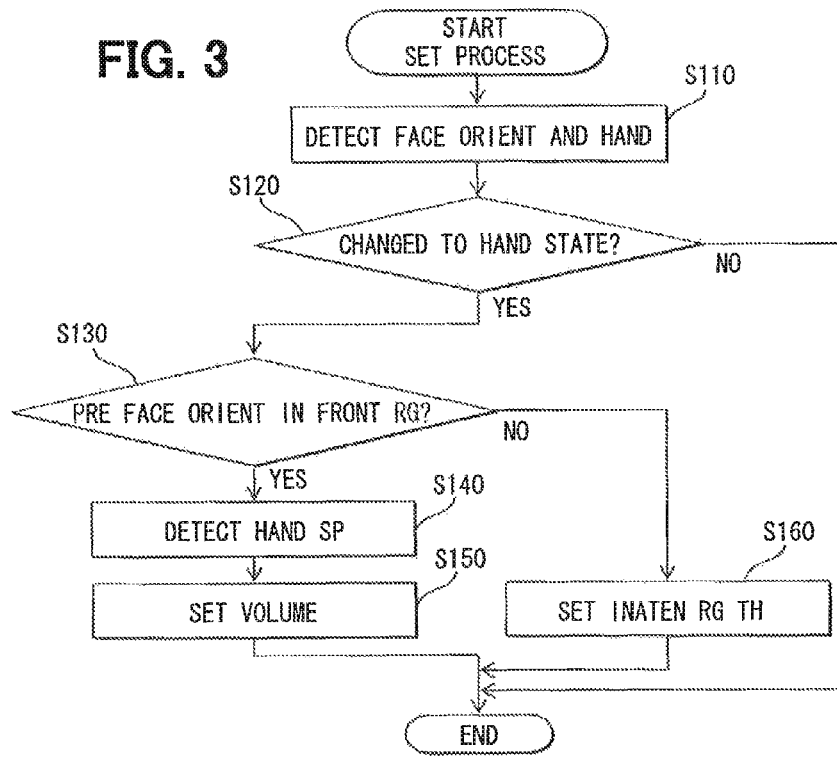
FIG. 3 is a flowchart showing a setting process of parameters, which are used for determining the inattentive state, according to a first embodiment of the present disclosure.

The following will describe the setting process executed at S60 with reference to FIG. 3. When the setting process starts, at S110, the controller 6 detects the face orientation and a hand of the driver by performing an image recognition process, such as a pattern matching, to the latest image data obtained at s10.

Figure 4:
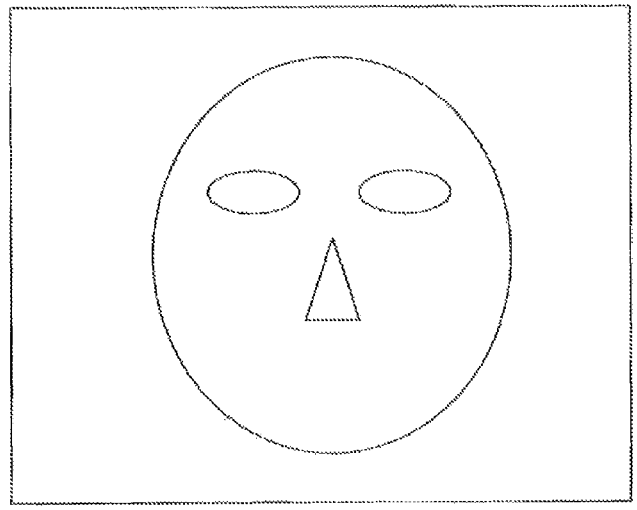
FIG. 4 is a diagram showing an image taken by a camera of the inattentive state determination apparatus according to the first embodiment.
Figure 5:
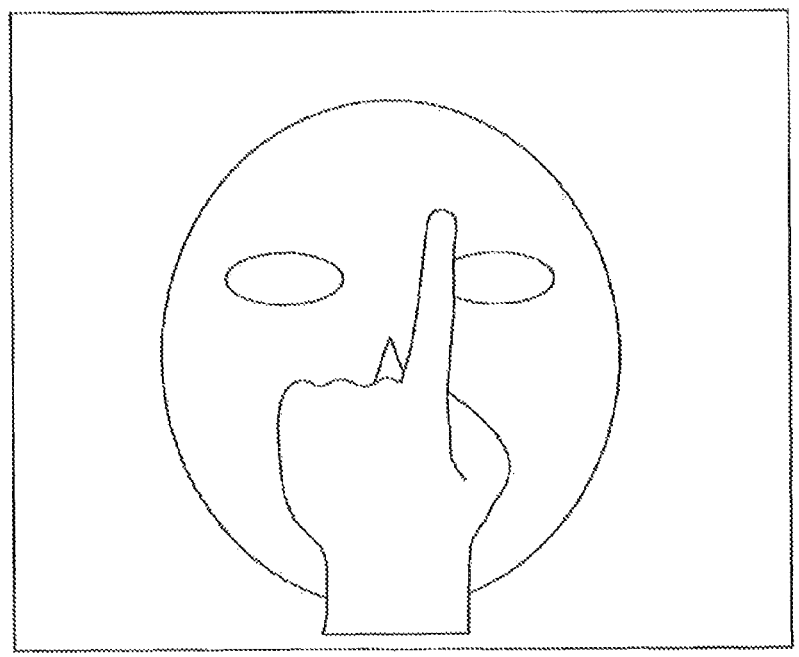
FIG. 5 is a diagram showing an image taken by the camera of the inattentive state determination apparatus according to the first embodiment.

As shown in FIG. 4, when only the face of the driver is taken by the camera 3, the controller 6 can detect the face orientation of the driver at S110. Further, as shown in FIG. 5, when the face and the hand are taken together by the camera 3, the controller 6 fails to detect the face orientation of the driver at S110.

Specifically, at S110, the controller 6 calculates a brightness threshold of a face area based on brightness values of pixels included in the face area. The brightness values of the pixels included in the face area are obtained by the image recognition process. Then, the controller 6 extracts a region having higher brightness values than the brightness threshold, and performs the pattern matching to the extracted region in order to detect the hand of the driver.

Figure 7:
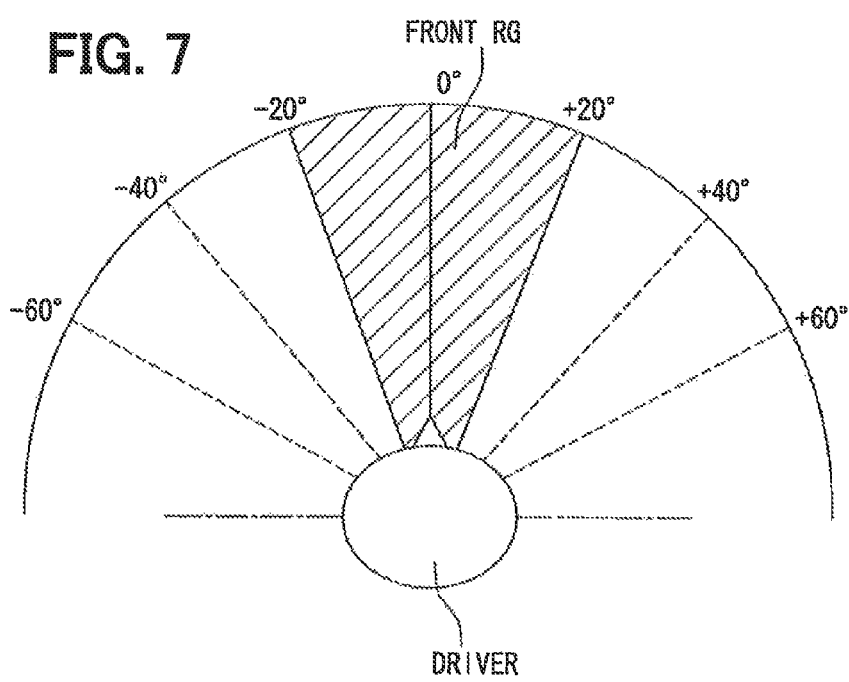
FIG. 7 is a diagram showing an example of a predetermined front range of a face orientation.

At S120, the controller 6 determines whether the state of the driver is changed from a first state to a second state, which follows immediately after the first state. In the first state, only the face of the driver is taken by the camera 3 without the hand. In the second state, the face of the driver and the hand are taken by the camera 3 together. The second state is also referred to as a hand state. At S120, when the controller 6 determines that the driver is not changed from the first state to the second state (S120: NO), the controller 6 ends the setting process. At S120, when the controller 6 determines that the driver is changed from the first state to the second state (S120:YES), the controller 6 determines whether the face orientation in the first state is within a predetermined front range (RG) at S130 based on the face orientation detected at S110. As shown in FIG. 7, in the present embodiment, the predetermined front range is set from −20 degrees to +20 degrees horizontally with respect to a longitudinal direction of the vehicle, which corresponds to zero degree. Hereinafter, the longitudinal direction is also referred to as a front direction of the vehicle. When the face orientation is within the predetermined front range, the face of the driver is determined to be oriented to the front.

At S130, when the controller 6 determines that the face orientation is within the predetermined front range (S130: YES), the controller 6 further performs the image recognition process, such as the pattern matching, to image data corresponding to the second state at S140 in order to detect a hand shape of the hand of the driver. Specifically, the controller 6 detects the number of fingers of the hand. In the present disclosure, the fingers include the thumb.

At S150, the controller 6 sets the parameter of the audio warning output from the audio output device 5 corresponding to the number of the fingers detected at S140. The parameter is a volume of the audio warning. In the present embodiment, the volume of the audio warning is set such that the volume increases with an increase of the number of the fingers. Then, the controller 6 ends the setting process. In the present embodiment, the volume of the audio warning output from the audio output device 5 is salable among level zero, level one, level two, and level three. The volume increases with an increase of the level. The level zero of the volume corresponds to a mute state of the audio output device 5, and the level three corresponds to a maximum volume of the audio warning. The level of the volume is set corresponding to the number of the fingers. For example, when the number of the fingers is zero, the level of the volume is set to zero; when the number of the fingers is one, the level of the volume is set to one; when the number of the fingers is two, the level of the volume is set to two; and when the number of the fingers is three, the level of the volume is set to three. For example, as shown in FIG. 5, when the number of the fingers is one, the level of the volume is set to one.

Figure 6:
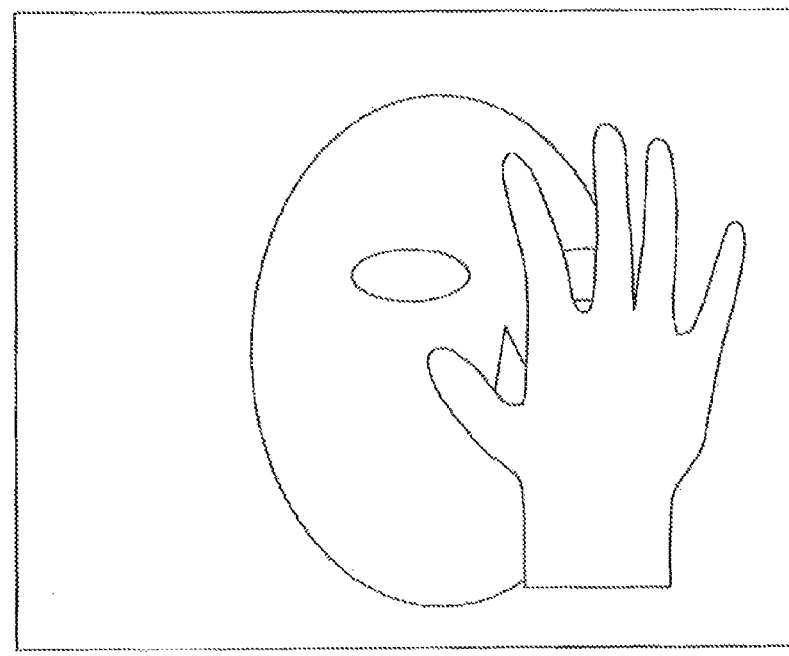
FIG. 6 is a diagram showing an image taken by the camera of the inattentive state determination apparatus according to the first embodiment.

At S130, when the controller 6 determines that the face orientation is out of the predetermined front range (S130: NO) as shown in FIG. 6, the controller 6 sets the inattentive state threshold range based on the face orientation in the first state at S160. The inattentive state threshold range is defined within a first limit to a second limit. Then, the controller 6 ends the setting process. Specifically, when an angle between the face orientation and the longitudinal direction in the first state is X degrees, the inattentive state threshold range is set within a range of −X degrees to +X degrees with respect to the longitudinal direction. Herein, X is defined as an integer within a range from twenty to ninety. That is, a lower limit corresponding to the first limit and an upper limit corresponding to the second limit of the inattentive state threshold range are set in a symmetric manner corresponding to the angle between the face orientation and the longitudinal direction in the first state with respect to the longitudinal direction. Further, the first limit may correspond to the upper limit, and the second limit may correspond to the lower limit.

With above-described configurations, the inattentive state determination apparatus 1 controls the camera 3 to successively take images of the face of the driver, and obtains the image data of the images. Then, the face orientation of the driver is detected based on the image data at S30 and S110. Then, the inattentive state determination apparatus 1 determines whether the driver is in the state in which the face orientation is out of the inattentive state threshold range for the inattentive state threshold period at S40. When the state continues for the inattentive state period threshold, the inattentive state determination apparatus 1 determines that the driver is in the inattentive state, and activates the audio output device 5 to output the audio warning at the predetermined volume in order to notify the inattentive state to the driver at S50.

Further, when the hand of the driver is taken by the camera 3, that is the driver is in the second state, the inattentive state determination apparatus 1 detects the hand shape at S140 based on the image data. Then, the inattentive state determination apparatus 1 sets the volume of the audio warning output from the audio output device 5 based on the hand shape at S150 and sets the inattentive state threshold range for determining the inattentive state based on the face orientation at S160.

As described above, the inattentive state determination apparatus 1 sets the volume of the audio warning and the inattentive state threshold range for determining the inattentive state based on the image data of the images taken by the camera 3. The driver can change the face orientation and the hand shape according to a will of the driver. For example, the driver may turn the face to the following directions including the front direction, a left direction perpendicular to the front direction, a right direction perpendicular to the front direction, a direction between the front direction and the left direction, a direction between the front direction and the right direction. Further, the driver may change the hand shape among the following three shapes including a paper-shape, a scissors-shape, and a rock-shape. Thus, the driver can link one of the face directions and the hand shapes to a parameter of the inattentive state determination condition or the audio warning. Further, the driver can link a combination of a face direction and a hand shape to a parameter of the inattentive state determination condition or the audio warning. Thus, hardware configurations, such as the switches, for setting the parameters used to determine the inattentive state are not needed in the inattentive state determination apparatus 1 according to the present embodiment. Thus, it is easy to add a parameter setting function, which sets or changes parameters for determining and warning the inattentive state, to the inattentive state determination apparatus 1 according to the present embodiment.

In the present embodiment, the number of the fingers is detected as the hand shape, and the number of the fingers is linked to the parameter of the audio warning. Further, other hand shapes, such as the rock-shape and the scissors-shape, may be linked to another parameter of the inattentive state determination condition or the audio warning, which can be indicated by quantification.

When the driver sets the inattentive state threshold range with a conventional apparatus having the switches, the driver may be confused about a correspondence between an angular degree and an actual face orientation. For example, the driver may be not clear about how large an angle of 30 degrees is and which face orientation corresponds to the angle of 30 degrees. Thus, when the driver sets the inattentive state threshold range within a range of −30 degrees to +30 degrees, the inattentive state threshold range that actually set by the driver and the inattentive state threshold range that expected by the driver may be different. Thus, the inattentive state determination apparatus 1 may warn the driver in a case where the driver does not consider the state of himself or herself is in the inattentive state. Further, in a case where the driver is actually in the inattentive state, the inattentive state determination apparatus 1 may fail to warn the inattentive state to the driver.

In the inattentive state determination apparatus 1 according to the present embodiment, the inattentive state threshold range is set at S160 based on the face orientation of the driver in the first state. Specifically, one of the limit values of the inattentive state threshold range is set equal to the face orientation of the driver in the first state, and the other of the limit values is set in a symmetric manner with respect to the longitudinal direction. Thus, the driver can set the inattentive state threshold range by turning the face to a direction to be actually set as the lower limit or the upper limit of the inattentive state threshold range. Thus, a difference between the inattentive state threshold range, which has been set by the driver, and the inattentive state threshold range, which is expected to be set by the driver, can be reduced.

Further, when the face orientation is determined to be within the predetermined front range at S130, the volume of the audio warning output from the audio output device 5 is set based on the hand shape at S150. Since the inattentive state threshold range is generally greater than the predetermined front range, when the face orientation is determined to be out of the predetermined front range, the inattentive state threshold range is set based on the face orientation at S160. That is, the driver is able to select setting the volume or setting the inattentive state threshold range by the face orientation. Thus, hardware configurations, such as the switches, for setting the parameters used to determine the inattentive state are not needed in the inattentive state determination apparatus 1 according to the present embodiment. Thus, it is easy to add the parameter setting function to the inattentive state determination apparatus 1 according to the present embodiment.

Further, the inattentive state determination apparatus 1 detects the number of the fingers as the hand shape at S110. Then, the inattentive state determination apparatus 1 sets the volume of the audio warning output from the audio output device 5 corresponding to the number of the fingers. Thus, the driver is able to set the volume of the audio warning in an easy way by changing the hand shape, that is, the number of the fingers.

Further, the inattentive state determination apparatus 1 determines whether the driver is changed from the first state to the second state at S120. When the inattentive state determination apparatus 1 determines that the driver has changed from the first state to the second state (S120: YES), the inattentive state determination apparatus 1 sets the inattentive state threshold range based on the face orientation in the first state. That is, under a condition that the driver changes from the first state to the second state by moving the hand, the inattentive state determination apparatus 1 further sets the volume of the audio warning and the inattentive state threshold range. Thus, the switches for setting the volume and the inattentive state threshold range are not needed in the inattentive state determination apparatus 1 according to the present embodiment. Thus, it is easy to add the parameter setting function to the inattentive state determination apparatus 1 according to the present embodiment.

In the present embodiment, the parameters of the inattentive state determination condition and the parameter of the audio warning are set based on the face direction before the driver changes from the first state to the second state. That is, the parameters of the inattentive state determination condition and the parameter of the audio warning are set based on the face direction in the first state. Thus, the driver needs to turn the face to the direction to be set as the lower limit or the upper limit of the inattentive state threshold range before moving the hand In the present embodiment, the camera 3 and S10 may operate as an image taking section; S30 and S110 may operate as an orientation detection section; S40 may operate as a determination section; S50 may operate as a warning section; S140 may operate as a shape detection section; S150 and S160 may operate as a setting section. Further, S110 may operate as a hand detection section; S120 may operate as a state change determination section.

(Second Embodiment)

Figure 8:
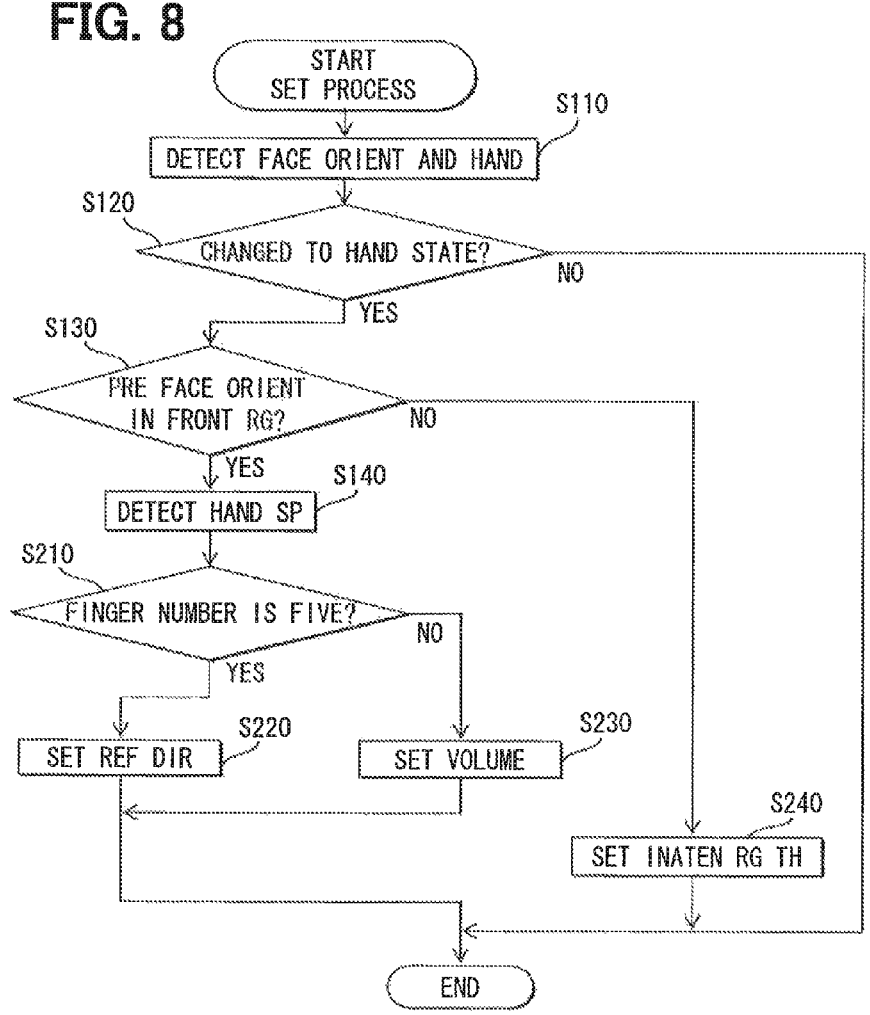
FIG. 8 is a flowchart showing a setting process of parameters, which are used for determining the inattentive state, according to a second embodiment of the present disclosure.
Figure 9:
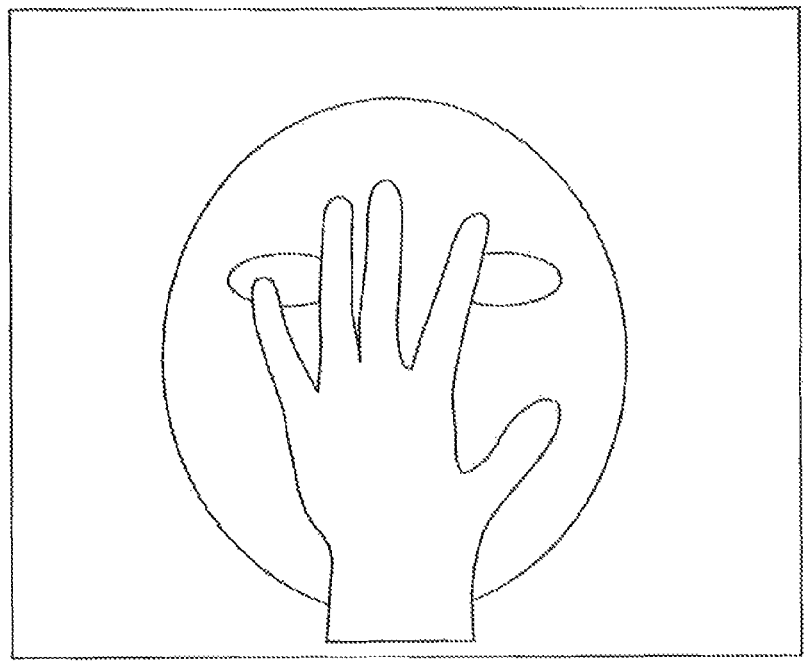
FIG. 9 is a diagram showing an image taken by a camera of an inattentive state determination apparatus according to the second embodiment.

The following will describe an inattentive state determination apparatus 1 according to a second embodiment of the present disclosure with reference to FIG. 8 and FIG. 9. The following will describe only different part from the first embodiment.

In the present embodiment, a setting process is changed from the first embodiment and the other is similar to the first embodiment. As shown in FIG. 8, in the setting process according to the present embodiment, the controller 6 executes S210 to S240, which are newly added, instead of S150 and S160 in the first embodiment.

After the controller 6 detects the hand shape at S140, the controller 6 determines whether the number of the fingers in the second state is five at S210. FIG. 9 shows an example of an image, which is taken by the camera 3 and includes five fingers.

At S210, when the controller 6 determines that the number of the fingers in the second state is five (S210: YES), the controller 6 sets a center position at S220, and stores the center position. Then, the controller 6 ends the setting process. The center position is defined as a center line of the inattentive state threshold range. The center position corresponds to a reference direction, which has an angle of Xc from the longitudinal direction. In the present embodiment, the controller 6 sets the angle Xc from the longitudinal direction to the reference direction equal to an angle between the face orientation and the longitudinal direction in the first state. For example, when the angle between the face orientation and the longitudinal direction is 5 degrees in the first state, the reference direction, which corresponds to the center position, is set to have the angle of 5 degrees (Xc=5 degrees) from the longitudinal direction. An initial value of the angle Xc of the reference direction from the longitudinal direction is set as zero. The reference direction, which has the angle of Xc from the longitudinal direction, is updated in each execution of the setting process.

At S210, when the controller 6 determines that the number of the fingers is less than five (S210: NO), similar to S150, the controller 6 sets the volume of the audio warning output from the audio output device 5 at S230 corresponding to the number of the fingers detected at S140. Then, the controller 6 ends the setting process.

At S130, when the controller 6 determines that the face orientation is out of the predetermined front range (S130: NO), the controller 6 sets the inattentive state threshold range based on the face orientation in the first state and the center position at S240. Then, the controller 6 ends the setting process. Specifically, when the angle Xc between the face orientation and the longitudinal direction has been set and the face orientation in the first state has an angle of X degrees with respect to the longitudinal direction, the attentive state threshold range is set within a range of (−X+2Xc) degrees to +X degrees. Further, when the angle Xc between the face orientation and the longitudinal direction has been set and the face orientation in the first state has an angle of −X degrees with respect to the longitudinal direction, the attentive state threshold range is set within a range of −X degrees to (+X+2Xc) degrees. For example, when the angle corresponding to the center position is 5 degrees, and the angle corresponding to the face orientation in the first state is 40 degrees with respect to the longitudinal direction, the inattentive state threshold range is set within a range of −30 degrees to +40 degrees. That is, the inattentive state threshold range is set in a symmetric manner with respect to the center position, which corresponds to the reference direction having the angle of Xc from the longitudinal direction.

With the above-described configuration, the inattentive state determination apparatus 1 can further set the center position in addition to the inattentive state threshold range and the volume of the audio warning. Further, the inattentive state threshold range can be set in the symmetric manner with respect to the center position, which is set based on the face orientation. Since the face direction toward the front may be slightly different from individual to individual. Thus, the inattentive state threshold range may be set more accurately and more individually for the driver based on the center position of the driver.

In the present embodiment, a hand shape in which the number of the fingers detected at S140 is five is defined as a center position setting condition.

(Third Embodiment)

Figure 10:
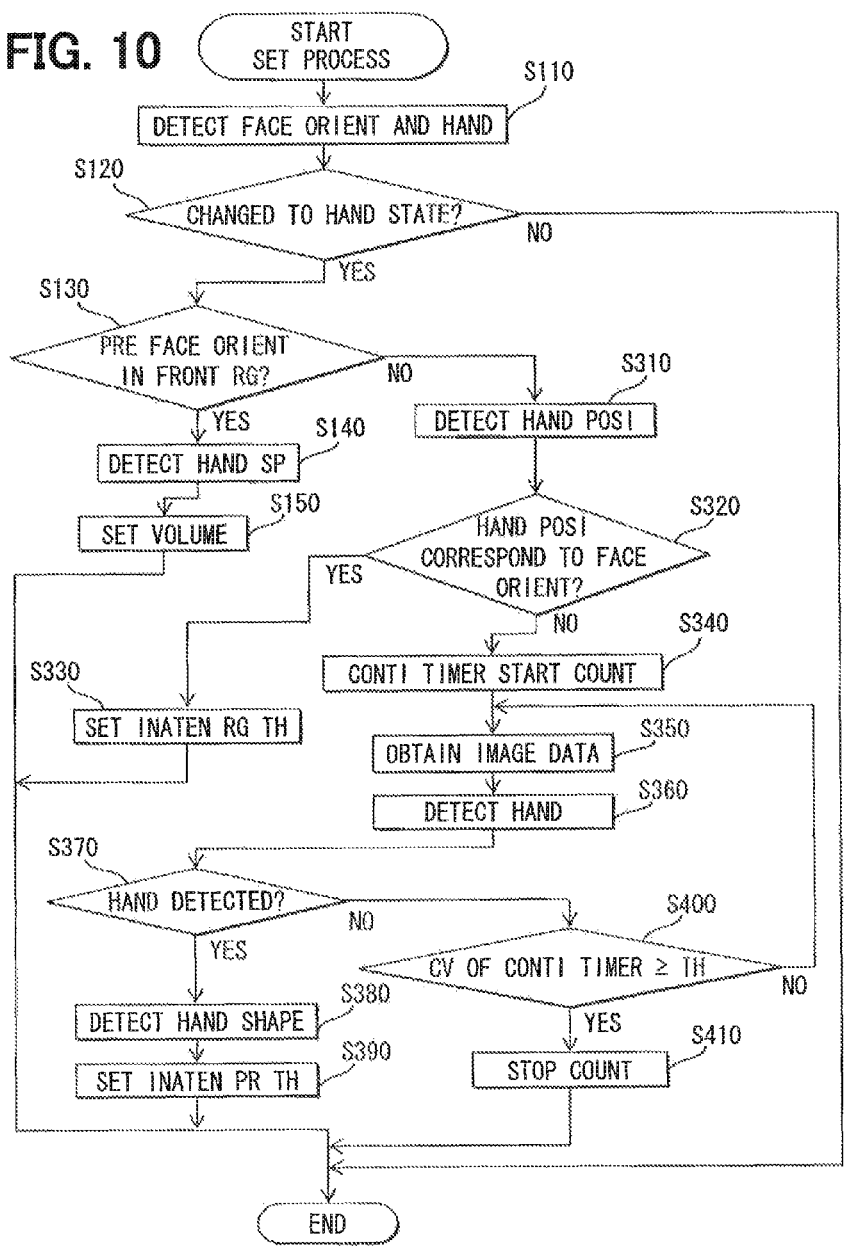
FIG. 10 is a flowchart showing a setting process of parameters, which are used for determining the inattentive state, according to a third embodiment of the present disclosure.
Figure 11:
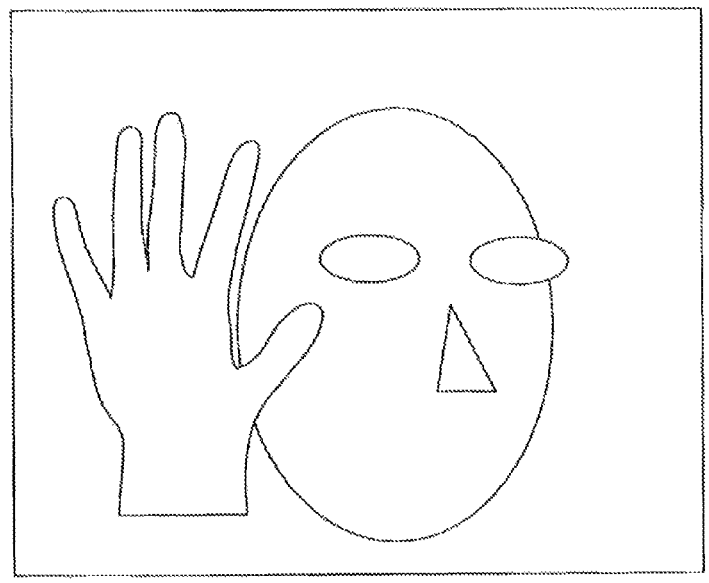
FIG. 11 is a diagram showing an image taken by a camera of an inattentive state determination apparatus according to the third embodiment.

The following will describe an inattentive state determination apparatus 1 according to a third embodiment of the present disclosure with reference to FIG. 10 and FIG. 11. The following will describe only different part from the first embodiment.

In the present embodiment, a setting process is changed from the first embodiment and the other is similar to the first embodiment. As shown in FIG. 10, in the setting process according to the present embodiment, the controller 6 executes S310 to S410, which are newly added, instead of S160 in the first embodiment.

At S130, when the controller 6 determines that the face orientation is out of the predetermined front range (S130: NO), the controller 6 further performs the image recognition process, such as the pattern matching, to image data corresponding to the second state at S310 in order to detect a position of the hand of the driver. Hereinafter, the position of the hand is referred to as a hand position. Specifically, the controller 6 determines whether the hand position is on the left side or on the right side in the image taken by the camera 3. Herein, the left side and right side is defined based on a vertical center line of the image taken by the camera 3.

At S320, the controller 6 determines whether the hand position is on the same side with the face orientation based on the face orientation detected at S110 and the hand position detected at S310. For example, when the face orients to the right side, the controller 6 determines whether the hand position is on the right side in the image. Similarly, when the face orients to the left side, the controller 6 determines whether the hand position is on the left side in the image. At S320, when the controller 6 determines that the hand position and the face orientation are on the same side (S320: YES), the controller 6 sets the inattentive state threshold range similar to S160 in the first embodiment. Then, the controller 6 ends the setting process.

At S320, when the controller 6 determines that the hand position is different from the face orientation (S320: NO), the controller 6 activates a continuation determination timer to start counting in an increment manner. The continuation determination timer increments a count value, for example, every 10 milliseconds. The count value has an initial value of zero. When the continuation determination timer stops the counting, the count value is reset to the initial value of zero. FIG. 11 shows an example of an image in which the hand position is different from the face orientation.

At S350, the controller 6 obtains the latest image data from the image capture board 4 similar to S10. At S360, the controller 6 performs the image recognition process, such as the pattern matching, to the latest image data obtained at S350 similar to S110 in order to detect the hand of the driver.

At S370, the controller 6 determines whether the hand of the driver is detected at S360. At S370, when the controller 6 determines that the hand of the driver is detected (S370: YES), the controller 6 performs the image recognition process, such as the pattern matching, to the image data including the hand of the drive at S380 in order to detect the hand shape and the number of the fingers. At S390, the controller 6 sets the inattentive state threshold period based on the number of the fingers detected at S380. Specifically, the inattentive state threshold period is set such that the inattentive state threshold period increases with an increase of the number of the fingers. In the present embodiment, when the number of the fingers detected at S380 is zero, one, two, three, and four, the inattentive state threshold period is set to one second, two seconds, three seconds, four seconds, and five seconds, respectively.

At S370, when the controller 6 determines that the hand of the driver is not detected (S370: NO), the controller 6 determines whether the count value of the continuation determination timer is equal to or larger than a threshold value at S400, In the present embodiment, the threshold value of the continuation determination timer is set as a value corresponding to five seconds. More specifically, since the continuation determination timer increments every 10 milliseconds in the present embodiment, the threshold value corresponding to five seconds is five hundreds. At S400, when the controller 6 determines that the count value of the continuation determination timer is smaller than the threshold value (S400: NO), the controller 6 returns to S350 and repeatedly executes S350, S360, S370, and S400. At S400, when the controller 6 determines that the count value of the continuation determination timer is equal to or larger than the threshold value (S400:

YES), the controller 6 controls the continuation determination timer to stop the counting at S410. Then, the controller 6 ends the setting process.

With above described configuration, when the image taken by the camera 3 includes the hand of the driver, the controller 6 detects the hand position at S310. When the controller 6 determines that the face orientation and the hand position are on the same side at S320 (S320: YES), the controller 6 sets the inattentive state threshold range at S330. When the controller 6 determines that the face orientation is different from the hand position (S320: NO), the controller 6 sets the inattentive state threshold period based on the number of the fingers at S390. Thus, hardware configurations, such as the switches, for setting the parameters used to determine the inattentive state are not needed in the inattentive state determination apparatus 1 according to the present embodiment. Thus, it is easy to add the parameter setting function to the inattentive state determination apparatus 1 according to the present embodiment.

Further, in the present embodiment, the inattentive state is determined to be continued for a threshold time by determining whether the count value of the continuation determination timer is equal to or larger than the threshold value. Thus, in a case where the driver is in the inattentive state for just a moment, the inattentive state is controlled not to be notified to the driver. Thus, the driver is not interrupted by the audio warning in the case where the driver is in the inattentive state for just a moment.

In the present embodiment, S310 may also operate as a hand position detection section. Further, a hand position which is positioned on the same side with the face orientation with respect to the vertical center line of the image is referred to as a predetermined first condition, and a hand position which is positioned on the different side from the face orientation with respect to the vertical center line of the image is referred to as a predetermined second condition.

(Fourth Embodiment)

The following will describe an inattentive state determination apparatus 1 according to a fourth embodiment of the present disclosure with reference to FIG. 12 to FIG. 15. The following will describe only different part from the first embodiment.

Figure 12:
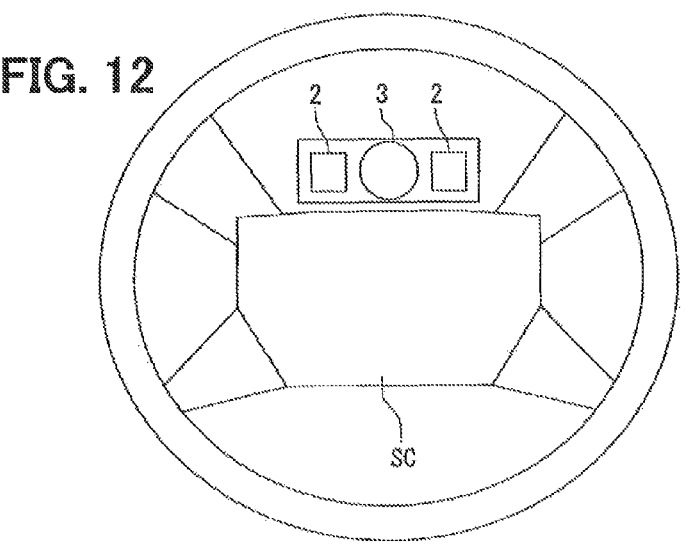
FIG. 12 is a diagram showing a position of the camera with respect to a steering wheel according to the third embodiment.

In the present embodiment, a setting process is changed from the first embodiment and the other is similar to the first embodiment. Further, as shown in FIG. 12, the infrared light emitting diodes 2 and the camera 3 are disposed on a steering wheel center cap (SC) of the vehicle in a vertical direction of the vehicle.

Figure 13:
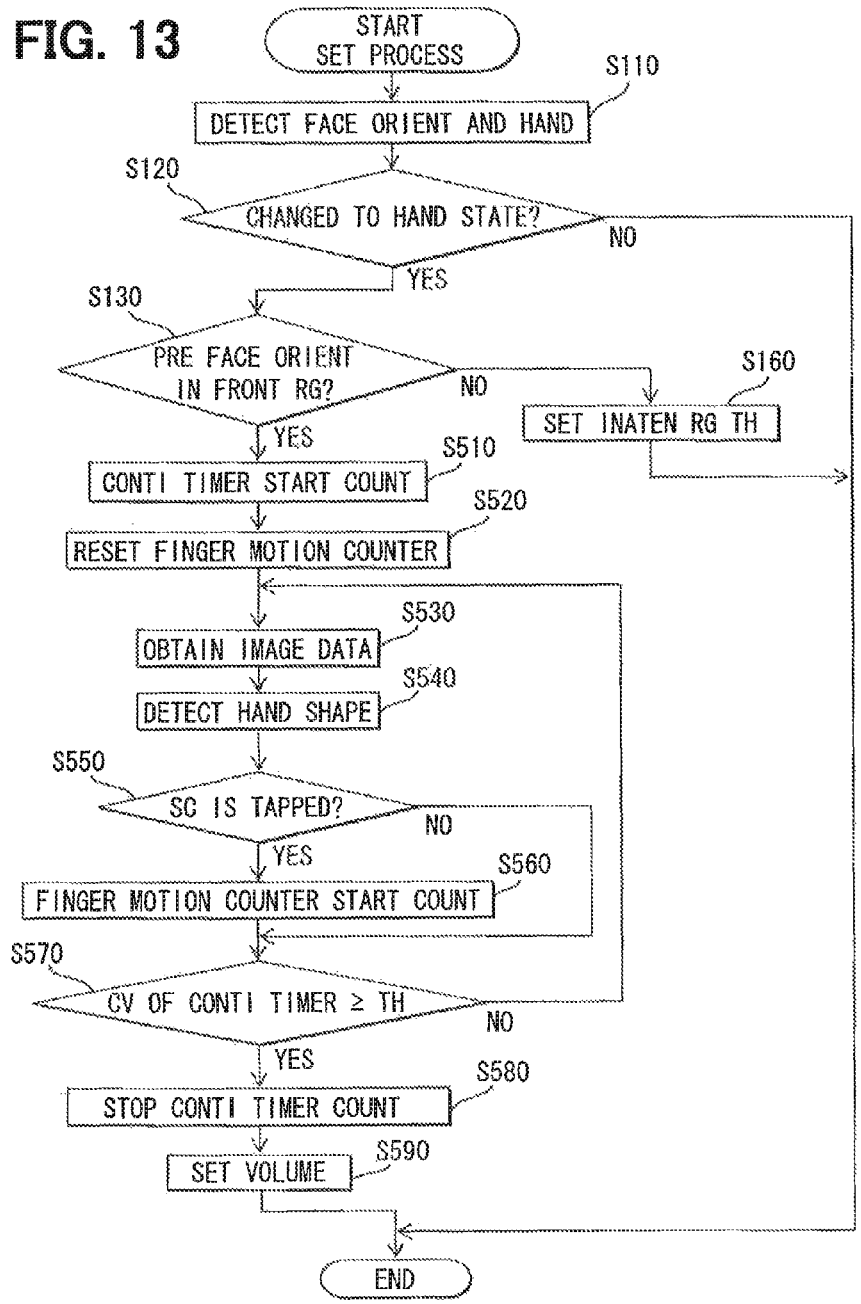
FIG. 13 is a diagram showing a setting process of parameters, which are used for determining the inattentive state, according to a fourth embodiment of the present disclosure.

As shown in FIG. 13, in the setting process according to the present embodiment, the controller 6 executes S510 to S590, which are newly added, instead of S140 to S160 in the first embodiment.

That is, at S130, when the controller 6 determines that the face orientation is within the predetermined front range (S130: YES), the controller 6 activates the continuation determination timer to start the counting at S510. The continuation determination timer increments a count value, for example, every 10 milliseconds. The count value has an initial value of zero. When the continuation determination timer stops the counting, the count value is reset to the initial value of zero.

At S520, the controller 6 resets an initial value of a finger motion counter, which counts the number of taps when the driver taps the steering wheel center cap with a finger. In the present embodiment, the initial value of the finger motion counter is set to zero.

At S530, the controller 6 obtains the latest image data from the image capture board 4 similar to S10. At S540, the controller 6 performs the image recognition process, such as the pattern matching, to the latest image data obtained at S530 in order to detect the hand shape of the driver.

Figure 14:
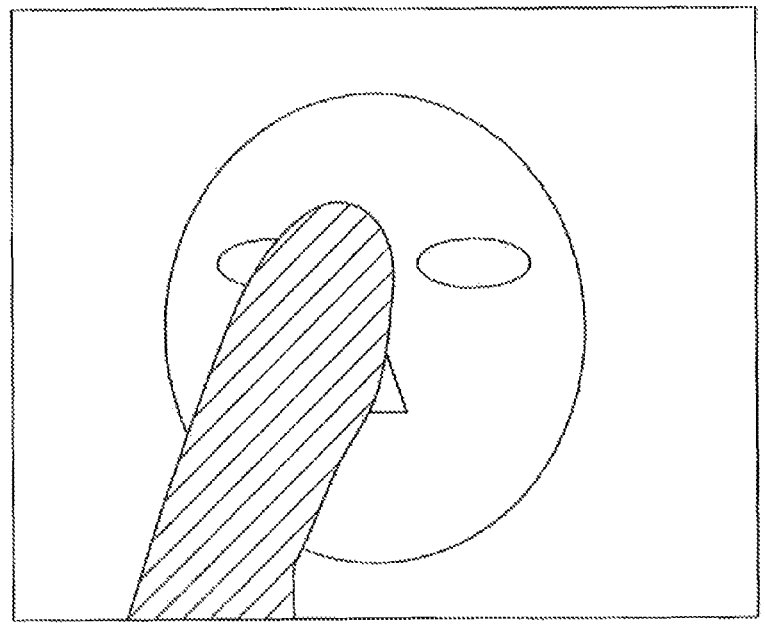
FIG. 14 is a diagram showing an image taken by a camera of the inattentive state determination apparatus according to the fourth embodiment.

In the present embodiment, the finger motion indicates one or more taps to the steering wheel center cap with a finger, for example, an index finger. Further, as described above, the camera 3 is disposed on the steering wheel center cap (SC) of the vehicle in the vertical direction. FIG. 14 shows an example of an image taken before the finger motion is performed by the driver. In FIG. 14, a hatched area indicates the finger of the driver. That is, in the image taken before the tap, the hand shape is long and slender approximately in the vertical direction and covers a part of the face of the driver.

Figure 15:
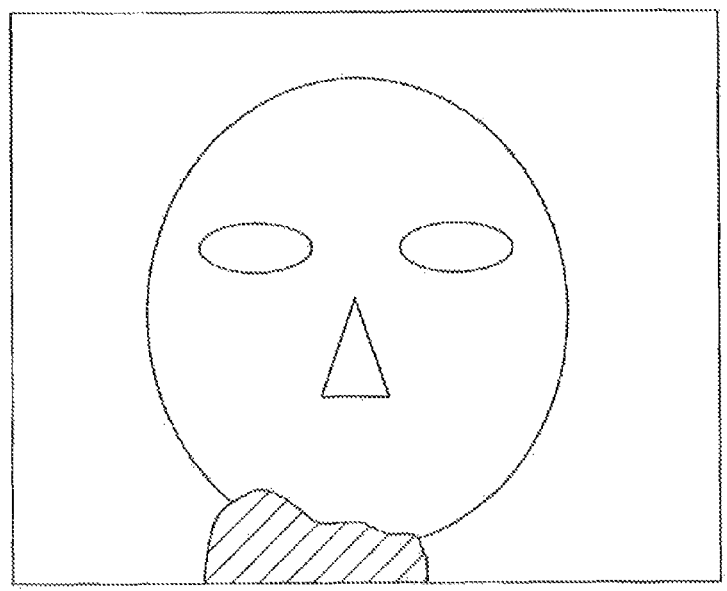
FIG. 15 is a diagram showing an image taken by a camera of the inattentive state determination apparatus according to the fourth embodiment.

FIG. 15 shows an example of an image taken immediately after the tap is performed by the driver. Similarly, in FIG. 15, a hatched area indicates the finger of the driver. That is, in the image taken immediately after the finger motion is performed, the hand shape exists only at an upper portion of the image.

At S550, the controller 6 determines whether the state of the driver is changed from a pre-tap state to a post-tap state. As described above, FIG. 14 is the example of the image indicating the pre-tap state, and FIG. 15 is the example of the image indicating the post-tap state. At S550, when the controller 6 determines that the state of the driver is changed from the pre-tap state to the post-tap state (S550: YES), the controller 6 determines that the steering wheel center cap is tapped once by the driver. Then, at S560, the controller 6 controls the finger motion counter to increment the count value, and proceeds to S570.

At S550, when the controller 6 determines that the state of the driver is not changed from the pre-tap state to the post-tap state (S550: NO), the controller 6 determines that the steering wheel center cap is not tapped by the driver, and proceeds to S570.

At S570, the controller 6 determines whether the count value of the continuation determination timer is equal to or larger than a threshold value. In the present embodiment, the threshold value of the continuation determination timer is set as a value corresponding to five seconds. More specifically, since the continuation determination timer increments every 10 milliseconds in the present embodiment, the threshold value corresponding to five seconds is five hundreds. At S570, when the controller 6 determines that the count value of the continuation determination timer is smaller than the threshold value (S570: NO), the controller 6 returns to S530 and repeatedly execute S530 to S570. At S570, when the controller 6 determines that the count value of the continuation determination timer is equal to or larger than the threshold value (S570: YES), the controller 6 controls the continuation determination timer to stop the counting at S580.

At S590, the controller 6 sets a volume of the audio warning output from the audio output device 5 corresponding to the count value of the finger motion counter, In the present embodiment, the volume of the audio warning is set such that the volume increases with an increase of the count value of the finger motion counter. Specifically, when the count value of the finger motion counter is zero, one, two, and three, the volume is set to level zero, level one, level two, and level three, respectively. Then, the controller 6 ends the setting process.

With above-described configuration, the controller 6 detects the hand shape during the finger motion at 5540 and S550. Then, the controller 6 activates the finger motion counter to start the counting at S560 based on the hand shape detected at S540 and S550. Then, the controller 6 sets the volume of the audio warning output from the audio output device 5 corresponding to the count value of the finger motion counter at S590. Thus, the volume of the audio warning output from the audio output device 5 is set in an easy way based on the number of the taps on the steering wheel center cap. Further, another parameter of the audio warning and another parameter of the inattentive state determination condition, which can be indicated by quantification, may be set based on the count value of the finger motion counter. For example, the volume of the audio warning may be set to increase with an increase of a count value of taps on the steering wheel of the vehicle.

In the present embodiment, S540 and S550 may operate as a hand shape detection section; S560 may operate as a counting section; and S590 may operate as a setting section.

(Fifth Embodiment)

The following will describe an inattentive state determination apparatus 1 according to a fifth embodiment of the present disclosure with reference to FIG. 16. The following will describe only different part from the first embodiment.

In the present embodiment, a setting process is changed from the first embodiment and the other is similar to the first embodiment. As shown in FIG. 16, in the setting process according to the present embodiment, the controller 6 executes S710 to S780, which are newly added, instead of S130 in the first embodiment.

At S120, when the controller 6 determines that the state of the driver is changed from the first state to the second state (S120: YES), the controller 6 controls the audio output device 5 to output an audio message indicating that the inattentive state determination apparatus 1 enters a setting mode. Then, at S720, the controller 6 activates the continuation determination timer to start the counting. The continuation determination timer increments a count value, for example, every 10 milliseconds. The count value has an initial value of zero. When the continuation determination timer stops the counting, the count value is reset to the initial value of zero.

At S730, the controller 6 obtains the latest image data from the image capture board 4 similar to S10. At S740, the controller 6 performs the image recognition process, such as the pattern matching, to the latest image data obtained at S730 similar to S110 in order to detect the hand and the face orientation of the driver.

At S750, the controller 6 determines whether the hand of the driver is detected at S740. At S750, when the controller 6 determines that the hand of the driver is detected (S750: YES), the controller 6 further determines whether the face orientation in the first state is within the predetermined front range based on the detection result at S110 and S740. In the present embodiment, the predetermined front range is set within a predetermined range, such as from −20 degrees to +20 degrees with respect to the longitudinal direction of the vehicle.

At S760, when the controller 6 determines that the face orientation in the first state is within the predetermined front range (S760: YES), the controller 6 proceeds to S140. At S760, when the controller 6 determines that the face orientation in the first state is out of the predetermined front range (S760: NO), the controller 6 proceeds to S160.

At S750, when the controller 6 determines that the hand of the driver is not detected (S750: NO), the controller 6 further determines whether the count value of the continuation determination timer is equal to or larger than a threshold value at S770. In the present embodiment, the threshold value of the continuation determination timer is set as a value corresponding to five seconds. More specifically, since the continuation determination timer increments every 10 milliseconds in the present embodiment, the threshold value corresponding to five seconds is five hundreds. At S770, when the controller 6 determines that the count value of the continuation determination timer is smaller than the threshold value (S770: NO), the controller 6 returns to S730 and repeatedly executes S730, S740, S750, and S770. At S770, when the controller 6 determines that the count value of the continuation determination timer is equal to or larger than the threshold value (S770: YES), the controller 6 controls the continuation determination timer to stop the counting at S780. Then, the controller 6 ends the setting process.

With above-described configuration, the controller 6 determines whether the state of the driver is changed from the first state to the second state at S120. When the state of the driver is changed from the first state to the second state (S120: YES), the controller 6 sets the inattentive state threshold range based on the face orientation detected at a time, which is later than the second state. That is, the controller 6 sets the inattentive state threshold range based on the face orientation detected at S740. Thus, the driver needs to turn the face to the direction to be set as the lower limit or the upper limit of the inattentive state threshold range after moving the hand. Generally, under a condition that the driver changes from the first state to the second state by moving the hand, the inattentive state determination apparatus 1 sets the volume of the audio warning and the inattentive state threshold range based on the face orientation after the second state. Thus, the switches for setting the volume and the inattentive state threshold range are not needed in the inattentive state determination apparatus 1 according to the present embodiment. Thus, it is easy to add the parameter setting function to the inattentive state determination apparatus 1 according to the present embodiment.

In the present embodiment, when the state of the driver is changed from the first state to the second state, the audio output device 5 outputs the audio message indicating that the inattentive state determination apparatus 1 enters the setting mode at S710. Thus, the driver is notified that the driver can start the setting of the inattentive state threshold range. That is, the driver moves the hand to start the setting of the inattentive state threshold range first, and then, turns the face to the predetermined direction to be set as the lower limit or the upper limit of the inattentive state threshold range.

Further, after the setting of the inattentive state threshold range starts by moving the hand, when the hand of the driver is not detected for the threshold value of the continuation determination timer (S750: NO and S770: YES), the controller 6 ends the setting process. Thus, when the driver moves the hand carelessly and the setting of the inattentive state threshold range starts regardless of an intention of the driver, the driver may cancel the setting of the inattentive state threshold range by controlling the hand so that the hand is not taken by the camera 3. Thus, the setting of the inattentive state threshold range is limited to be performed against an intention of the driver.

(Other Embodiments)

In the foregoing embodiments, the inattentive state of the driver is determined based on the face orientation of the driver. Further, the controller 6 may detect a gaze direction of the driver as the determination target orientation based on images of eyes of the driver taken by the camera 3. In this case, the camera 3 successively takes images of the eyes of the driver. Then, the inattentive state of the driver may be determined based on the gaze direction of the driver.

Further, in the foregoing embodiments, the lower limit and the upper limit of the inattentive state threshold range are set in a symmetric manner based on the face orientation of the driver with respect to the longitudinal direction or a center position. Further, as shown in FIG. 17, the lower limit of the inattentive state threshold range may be set based on the face orientation on one of the left side and the right side and the upper limit of the inattentive state threshold range may be set based on the face orientation on the other of the left side and the right side.

As shown in FIG. 17, in the setting process according to another embodiment, the controller 6 executes S810 to S830, which are newly added, instead of S160 in the first embodiment.

At S130, when the controller 6 determines that the face orientation in the first state is out of the predetermined front range (S130: NO), the controller 6 further determines whether the face orientation is toward left side or right side at S810. At S810, when the controller 6 determines that the face orientation in the first state is toward left side (S810: YES), the controller 6 sets the lower limit, which corresponds to a minus value of the angle, as the face orientation on the left side at S820. Then, the controller 6 ends the setting process. At S810, when the controller 6 determines that the face orientation in the first state is toward right side (S810: NO), the controller 6 sets the upper limit, which corresponds to a plus value of the angle, as the face orientation on the right side at S830. Then, the controller 6 ends the setting process.

With the above-described configuration, the lower limit and the upper limit of the inattentive state threshold range may be set differently from each other. For example, the inattentive state threshold range may be set within a range from −25 degrees to +40 degrees.

In the fourth embodiment, the steering wheel center cap is tapped by the index finger of the driver. Further, the driver may tap the steering wheel center cap with a finger other than the index finger. Further, when the volume of the audio warning is set based on the number of the taps on the steering wheel center cap, the audio output device 5 may output an audio warning corresponding to the set volume at every tap to notify the volume to the driver.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An inattentive state determination apparatus being placed in a vehicle comprising:
   an image taking section that successively takes a plurality of images of a face of a determination target, the determination target being a person seated in a driving seat of the vehicle;
   an orientation detection section that detects a determination target orientation based on the plurality of images, the determination target orientation being one of a face orientation of the determination target and a gaze direction of the determination target;
   a determination section that determines whether the determination target is in an inattentive state based on the determination target orientation, the determination section determining that the determination target is in the inattentive state when an inattentive state determination condition is satisfied;
   a warning section that notifies the inattentive state to the determination target by outputting an audio warning when the determination section determines that the determination target is in the inattentive state, the audio warning being output corresponding to a parameter of the audio warning;
   a shape detection section that detects a hand shape of the determination target based on the plurality of images when one of the plurality of images includes a hand of the determination target;
   a setting section that sets at least one of the inattentive state determination condition and the parameter of the audio warning based on the hand shape and the determination target orientation: and
   a counting section, wherein:
   the image taking section is configured to take the plurality of images including both the face of the determination target and a finger of the determination target,
   the shape detection section detects, based on the plurality of images, a plurality of hand shapes of the determination target during a finger motion performed by the determination target,
   the finger motion refers to one or more taps on a steering wheel center cap of the vehicle,
   the counting section counts the number of the one or more taps based on the hand shapes of the determination target during the finger motion, and
   the setting section sets the parameter of the audio warning based on the number of the one or more taps.

2. The inattentive state determination apparatus according to claim 1, wherein:
   the inattentive state determination condition is satisfied when the determination target orientation is out of an inattentive state threshold range,
   the inattentive state threshold range, which is defined within a first limit to a second limit, refers to a range of the determination target orientation during a normal driving state of the determination target, and
   the setting section sets the first limit equal to the determination target orientation, and sets the second limit symmetrical to the first limit with respect to a front direction of the vehicle.

3. The inattentive state determination apparatus according to claim 2, wherein:
   when the determination target orientation is within a predetermined front range, the setting section sets the parameter of the audio warning based on the hand shape,
   the predetermined front range refers to a range of the determination target orientation when the determination target is oriented to front, and
   when the determination target orientation is out of the predetermined front range, the setting section sets the inattentive state threshold range based on the determination target orientation.

4. The inattentive state determination apparatus according to claim 3, wherein
   in a case where the determination target orientation is within the predetermined front range, the setting section:
      sets a center position of the inattentive state threshold range based on the determination target orientation when the hand shape is equal to a predetermined shape; and
      sets the parameter of the audio warning based on the hand shape when the hand shape is different from the predetermined shape.

5. The inattentive state determination apparatus according to claim 2, further comprising:

a hand position detection section that detects a hand position of the determination target based on the one of the plurality of images, wherein:

when the determination target orientation is out of the inattentive state threshold range for an inattentive state threshold period, the inattentive state determination condition is satisfied, when a predetermined first condition relative to the determination target orientation and the hand position is satisfied, the setting section sets the inattentive state threshold range based on the determination target orientation, when a predetermined second condition relative to the determination target orientation and the hand position is satisfied, the setting section sets the inattentive state threshold period based on the hand shape, and the first condition is set differently from the second condition.

6. The inattentive state determination apparatus according to claim 5, wherein:

in the one of the plurality of images, when the determination target orientation and the hand position are on a same side with respect to a vertical center line of the one of the plurality of images, the predetermined first condition is satisfied, and in the one of the plurality of images, when the determination target orientation and the hand position are on different sides with respect to the vertical center line, the predetermined second condition is satisfied.

7. The inattentive state determination apparatus according to claim 1, wherein the shape detection section detects the number of fingers of the determination target as the hand shape.

8. The inattentive state determination apparatus according to claim 1, further comprising:

a hand detection section that determines whether the hand of the determination target is included in each of the plurality of images; and a state change determination section that determines whether a state of the determination target is changed from a first state to a second state, the second state following immediately after the first state, wherein:

in the first state, the hand detection section determines that the hand is not included in one of the plurality of images taken in the first state, in the second state, the hand detection section determines that the hand is included in one of the plurality of images taken in the second state, when the state change determination section determines that the state of the determination target is changed from the first state to the second state, the setting section sets the inattentive state determination condition based on a previous determination target orientation, and the previous determination target orientation refers to a determination target orientation detected immediately before the state change determination section determines that the state of the determination target is changed from the first state to the second state.

9. The inattentive state determination apparatus according to claim 1, further comprising:

a hand detection section that determines whether the hand of the determination target is included in each of the plurality of images; and a state change determination section that determines whether a state of the determination target is changed from a first state to a second state, the second state following immediately after the first state, wherein:

in the first state, the hand detection section determines that the hand is not included in one of the plurality of images taken in the first state, in the second state, the hand detection section determines that the hand is included in one of the plurality of images taken in the second state, when the state change determination section determines that the state of the determination target is changed from the first state to the second state, the setting section sets the inattentive state determination condition based on a subsequent determination target orientation, and the subsequent determination target orientation is a determination target orientation detected immediately after the state change determination section determines that the state of the determination target is changed from the first state to the second state.

10. A method of determining an inattentive state comprising:

taking successively a plurality of images of both a face and a finger of a determination target;

detecting a determination target orientation of the determination target based on the plurality of images, the determination target orientation being one of a face orientation of the determination target and a gaze direction of the determination target;

determining whether an inattentive state determination condition is satisfied based on the determination target orientation;

warning an inattentive state of the determination target by outputting an audio warning when the inattentive state determination condition is satisfied, the audio warning being output corresponding to a parameter of the audio warning;

detecting a hand shape of the determination target based on the plurality of images when one of the plurality of images includes a hand of the determination target;

setting at least one of the inattentive state determination condition and the parameter of the audio warning based on the hand shape and the determination target orientation;

detecting, based on the plurality of images, a plurality of hand shapes of the determination target during a finger motion performed by the determination target, the finger motion referring to one or more taps on a steering wheel center cap of a vehicle; and setting the parameter of the audio warning based on a number of the one or more taps.

11. An inattentive state determination apparatus being placed in a vehicle comprising:

an image taking section that successively takes a plurality of images of a face of a determination target, the determination target being a person seated in a driving seat of the vehicle;

an orientation detection section that detects a determination target orientation based on the plurality of images, the determination target orientation being one of a face orientation of the determination target and a gaze direction of the determination target;

a determination section that determines whether the determination target is in an inattentive state based on the determination target orientation, the determination section determining that the determination target is in the inattentive state when an inattentive state determination condition is satisfied;

a warning section that notifies the inattentive state to the determination target by outputting an audio warning when the determination section determines that the determination target is in the inattentive state, the audio warning being output corresponding to a parameter of the audio warning;

a shape detection section that detects a hand shape of the determination target based on the plurality of images when one of the plurality of images includes a hand of the determination target; and a setting section that sets at least one of the inattentive state determination condition and the parameter of the audio warning based on the hand shape and the determination target orientation, wherein the inattentive state determination condition is satisfied when the determination target orientation is out of an inattentive state threshold range, the inattentive state threshold range, which is defined within a first limit to a second limit, refers to a range of the determination target orientation during a normal driving state of the determination target, the setting section sets the first limit equal to the determination target orientation, and sets the second limit symmetrical to the first limit with respect to a front direction of the vehicle, when the determination target orientation is within a predetermined front range, the setting section sets the parameter of the audio warning based on the hand shape, the predetermined front range refers to a range of the determination target orientation when the determination target is oriented to front, when the determination target orientation is out of the predetermined front range, the setting section sets the inattentive state threshold range based on the determination target orientation, and in a case where the determination target orientation is within the predetermined front range, the setting section:

sets a center position of the inattentive state threshold range based on the determination target orientation when the hand shape is equal to a predetermined shape; and sets the parameter of the audio warning based on the hand shape when the hand shape is different from the predetermined shape.

12. An inattentive state determination apparatus being placed in a vehicle comprising:

an image taking section that successively takes a plurality of images of a face of a determination target, the determination target being a person seated in a driving seat of the vehicle;

an orientation detection section that detects a determination target orientation based on the plurality of images, the determination target orientation being one of a face orientation of the determination target and a gaze direction of the determination target;

a determination section that determines whether the determination target is in an inattentive state based on the determination target orientation, the determination section determining that the determination target is in the inattentive state when an inattentive state determination condition is satisfied;

a warning section that notifies the inattentive state to the determination target by outputting an audio warning when the determination section determines that the determination target is in the inattentive state, the audio warning being output corresponding to a parameter of the audio warning;

a shape detection section that detects a hand shape of the determination target based on the plurality of images when one of the plurality of images includes a hand of the determination target;

a setting section that sets at least one of the inattentive state determination condition and the parameter of the audio warning based on the hand shape and the determination target orientation; and a hand position detection section that detects a hand position of the determination target based on the one of the plurality of images, wherein the inattentive state determination condition is satisfied when the determination target orientation is out of an inattentive state threshold range, the inattentive state threshold range, which is defined within a first limit to a second limit, refers to a range of the determination target orientation during a normal driving state of the determination target, the setting section sets the first limit equal to the determination target orientation, and sets the second limit symmetrical to the first limit with respect to a front direction of the vehicle, when the determination target orientation is out of the inattentive state threshold range for an inattentive state threshold period, the inattentive state determination condition is satisfied, when a predetermined first condition relative to the determination target orientation and the hand position is satisfied, the setting section sets the inattentive state threshold range based on the determination target orientation, when a predetermined second condition relative to the determination target orientation and the hand position is satisfied, the setting section sets the inattentive state threshold period based on the hand shape, the first condition is set differently from the second condition, in the one of the plurality of images, when the determination target orientation and the hand position are on a same side with respect to a vertical center line of the one of the plurality of images, the predetermined first condition is satisfied, and in the one of the plurality of images, when the determination target orientation and the hand position are on different sides with respect to the vertical center line, the predetermined second condition is satisfied.

* * * * *